May 2, 1939.  A. J. ALLEN  2,156,672
METER CABINET
Filed July 28, 1938   5 Sheets-Sheet 1
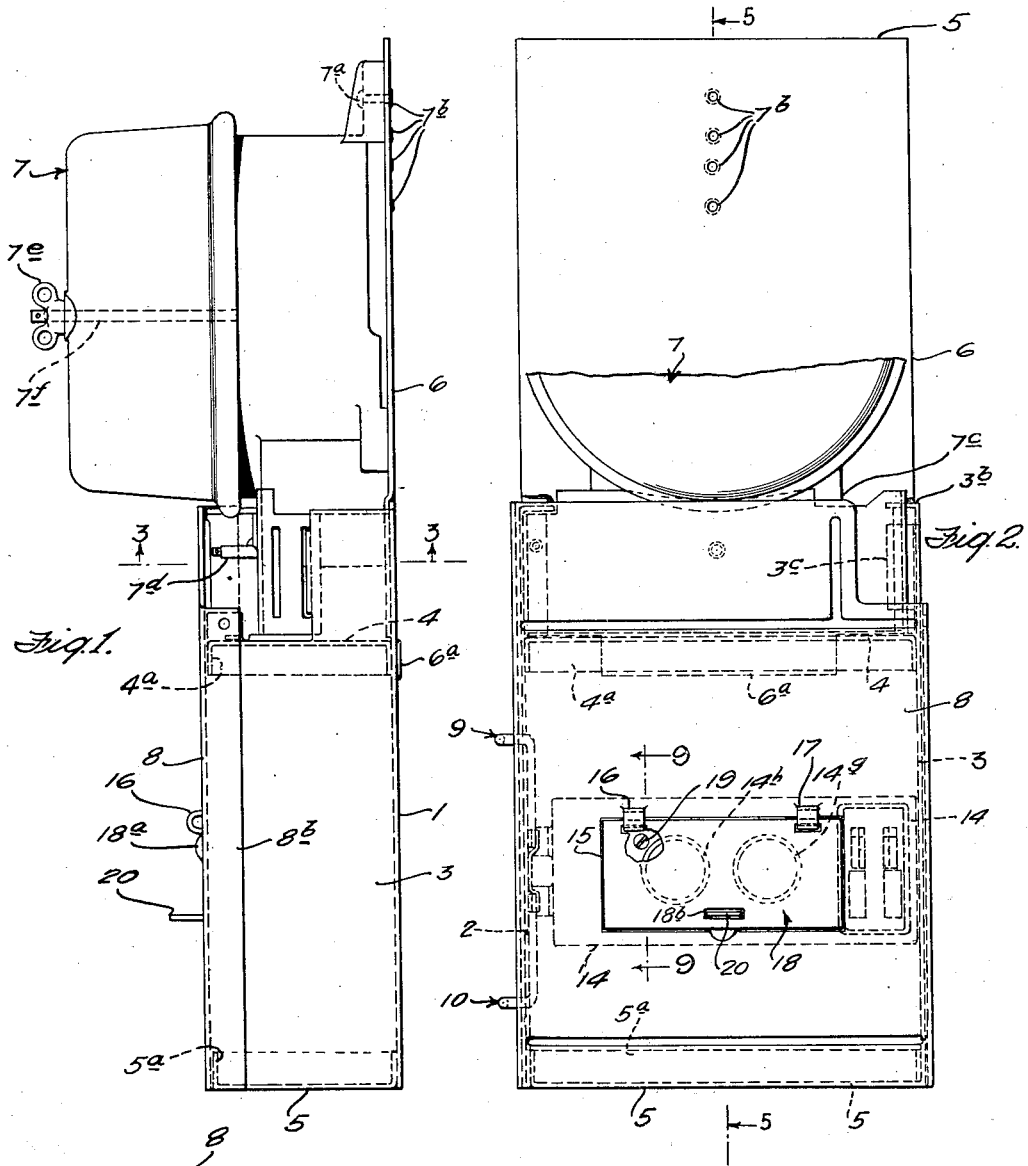
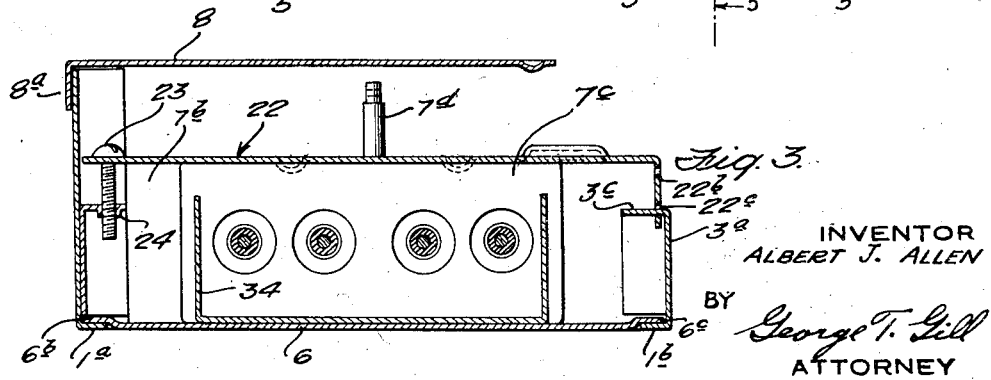
INVENTOR
ALBERT J. ALLEN
BY
George T. Gill
ATTORNEY

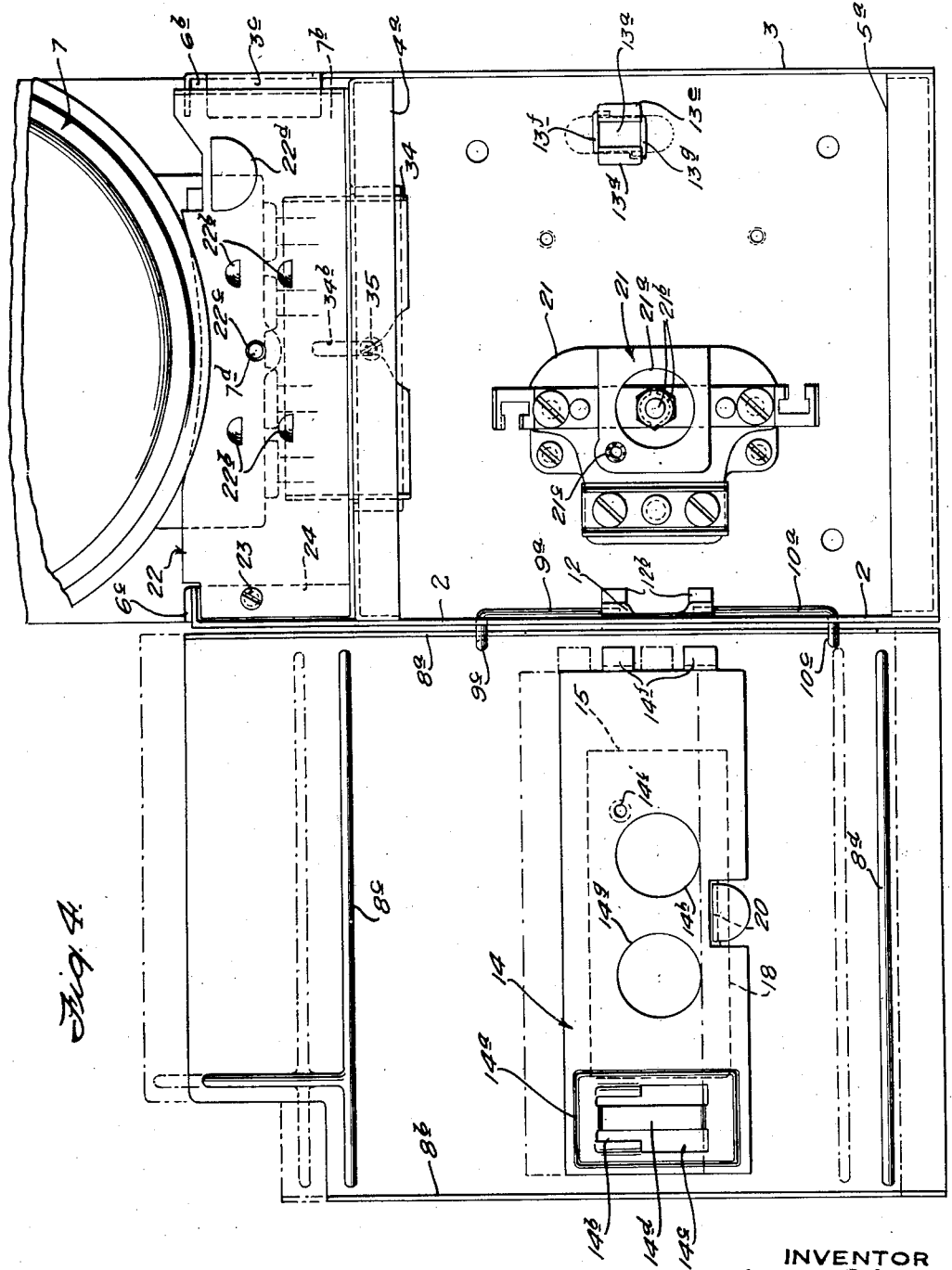

May 2, 1939.  A. J. ALLEN  2,156,672
METER CABINET
Filed July 28, 1938  5 Sheets-Sheet 3
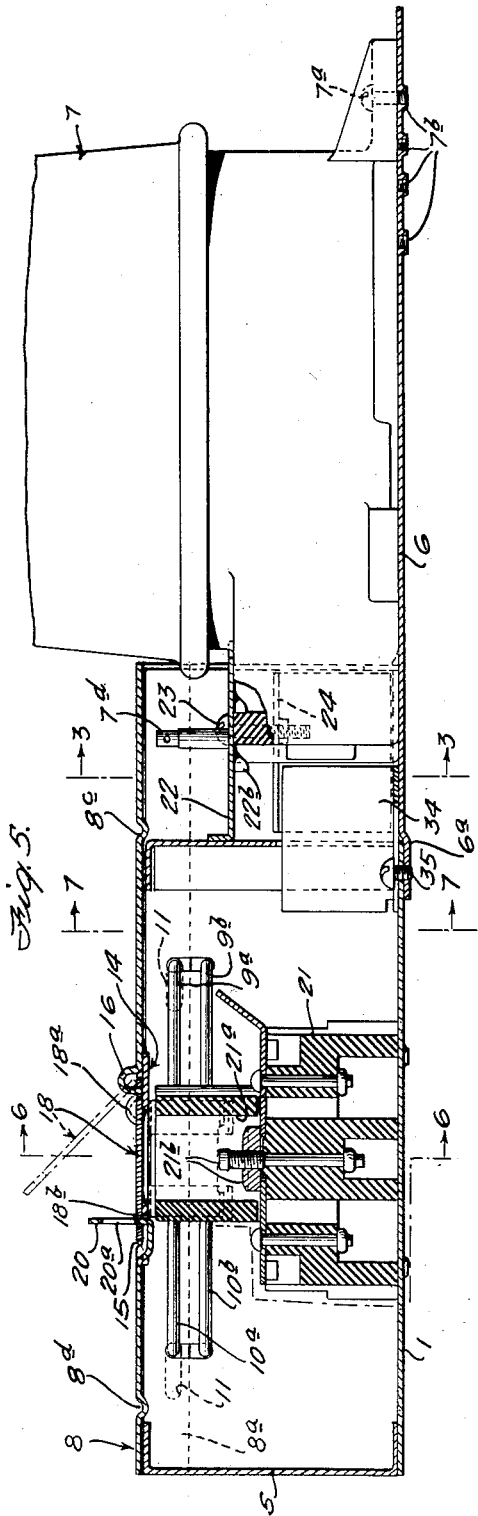
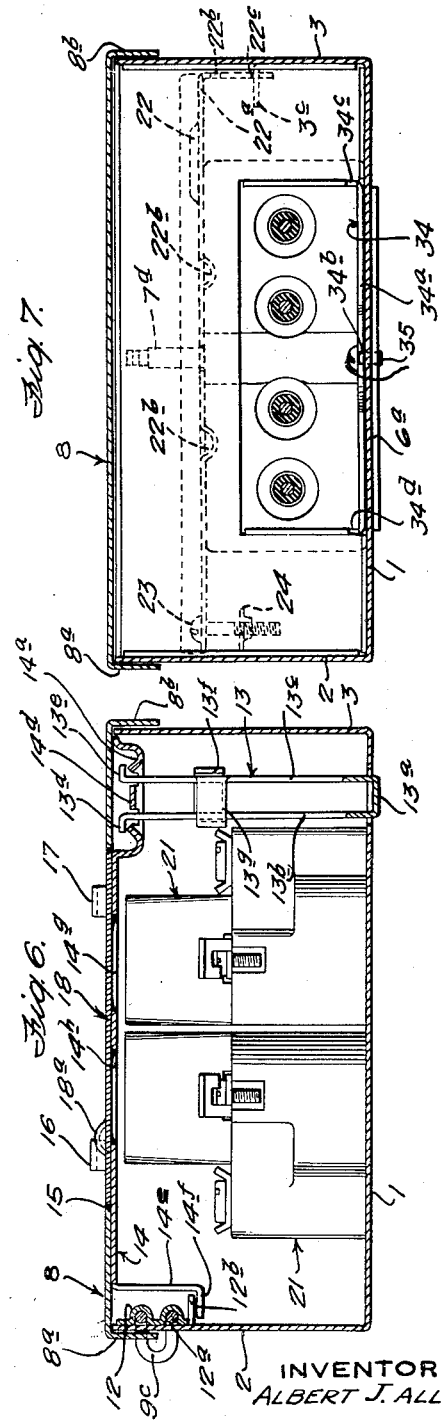
INVENTOR
ALBERT J. ALLEN.
BY George T. Gill
ATTORNEY May 2, 1939.  A. J. ALLEN  2,156,672
METER CABINET
Filed July 28, 1938　　5 Sheets-Sheet 4
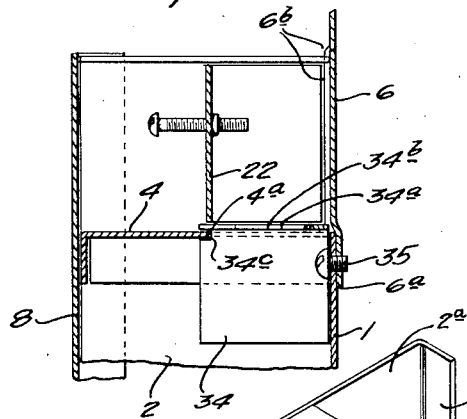
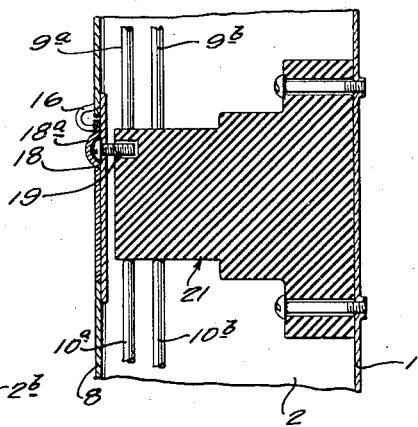
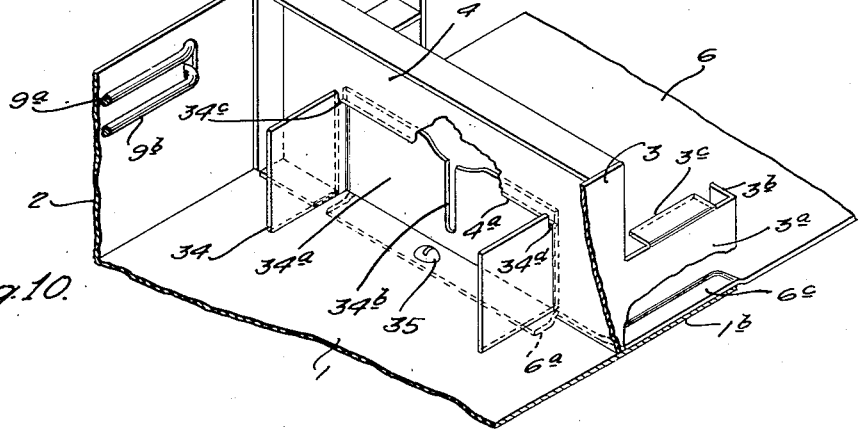
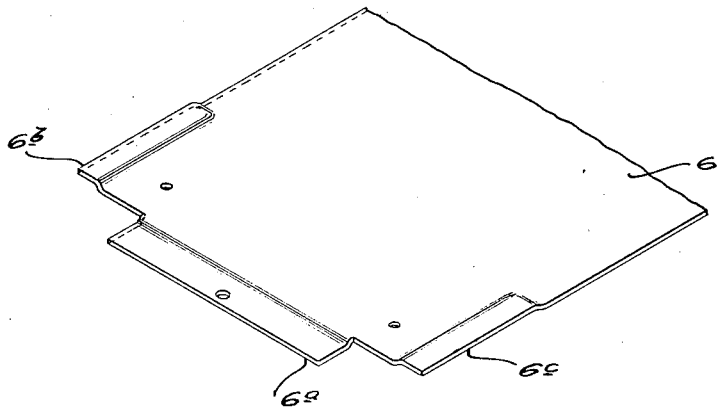
INVENTOR
ALBERT J. ALLEN
BY George F. Gill
ATTORNEY

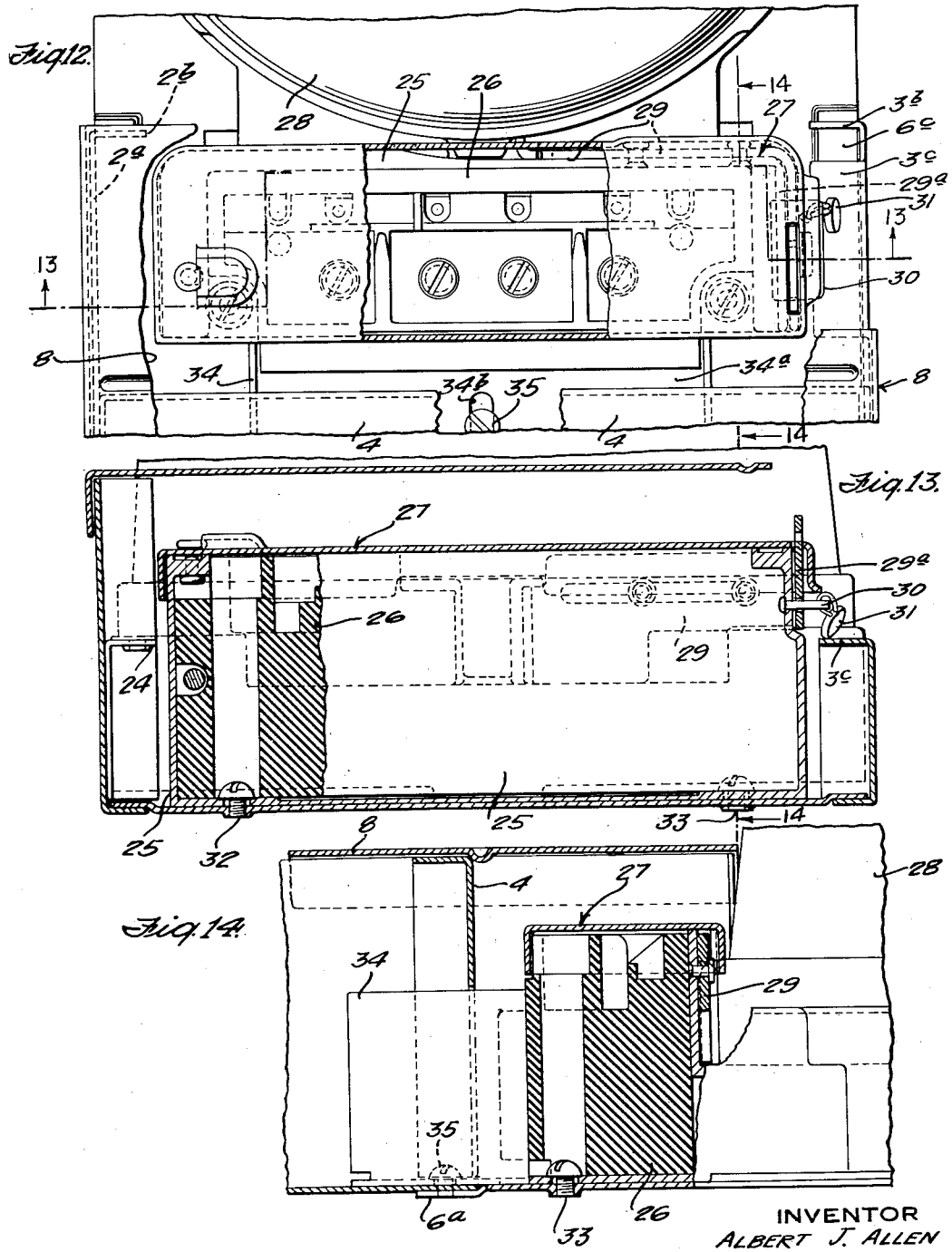

Patented May 2, 1939

2,156,672

UNITED STATES PATENT OFFICE 2,156,672

METER CABINET

Albert J. Allen, Brooklyn, N. Y., assignor to Metropolitan Device Corporation, a corporation of New York Application July 28, 1938, Serial No. 221,737

12 Claims. (Cl. 175—226)

The invention herein disclosed relates to a meter cabinet especially suitable for electrical watt-hour meters of the bottom connected type, and more particularly the invention comprehends certain improvements in a meter cabinet of the kind described in the copending application, Serial No. 148,921, filed June 18, 1937, for Meter box.

There are in use today, for measuring the consumption of electrical energy, a large variety of watt-hour meters of the bottom-connected type. Primarily, these meters vary in dimensions and it is an object of this invention to provide a pilfer-proof meter cabinet that is universal in its application in that it may be applied to various sizes of these watt-hour meters of the bottom-connected type. Another object of the invention is to provide a construction in a meter box of this type which protects the wires and terminal chamber of the meter and prevents movement of the meter in any direction. A further object of the invention is to provide an effective locking construction for the meter box.

These and other objects and certain advantages which will hereinafter appear are realized in the embodiment of the invention illustrated in the accompanying drawings and described in detail below.

In the drawings:

Fig. 1 is an end elevation of a meter box with a meter in place;

Fig. 2 is a front elevation of the same with the meter removed;

Fig. 3 is a transverse section taken on the line 3—3 of Fig. 1;

Fig. 4 is a front elevation with the cover of the box in the open position;

Fig. 5 is a sectional end elevation taken on the line 5—5 of Fig. 2;

Fig. 6 is a transverse section taken on the line 6—6 of Fig. 5;

Fig. 7 is a transverse section taken on the line 7—7 of Fig. 5;

Fig. 8 is a fragmentary, sectional, end elevation;

Fig. 9 is a fragmentary, sectional, end elevation taken on the line 9—9 of Fig. 2;

Fig. 10 is a fragmentary isometric;

Fig. 11 is a fragmentary isometric of a base plate;

Fig. 12 is a fragmentary elevation partly in section of another meter mounted in the meter box;

Fig. 13 is a transverse section of the same taken on the line 13—13 of Fig. 12; and Fig. 14 is a longitudinal section of the same taken on the line 14—14 of Fig. 12.

The meter box illustrated in the drawings is a sheet metal box and includes a back or rear wall 1, side walls 2 and 3, and end walls 4 and 5 which have lateral, inwardly extending flanges 4a and 5a respectively. The rear wall has integral side extensions 1a and 1b, one adjacent each side wall, that extend beyond the end wall 4. These side extensions form supports for a base plate 6 which in effect forms a continuation of the rear wall 1. The base plate 6 has an offset extension 6a at one end thereof and an offset portion 6b and 6c at each side thereof. These offset portions are provided to receive the side extensions 1a and 1b of the rear wall 1 and the offset extension 6a extends over the end edge of the rear wall 1 to which it is secured. The base plate 6 when in place lies in the same plane as the rear wall of the box and forms a base on which a meter 7 may be mounted, the meter being secured at its upper end by a screw 7a entering the proper opening 7b provided therefor. Several different base plates may be provided to accommodate different size meters.

An extension 2a of the side wall 2 and an extension 3b of the side wall 3 extend beyond the end wall 4. The extensions of the side walls 2 and 3 have inwardly extending lateral flanges 2b and 3b respectively at the ends thereof. The extension 3a of the side wall 3 is formed as shown (see Fig. 10) and is only approximately half the width of the side wall 3. A lateral flange or tongue 3c is formed on the side edge of the extension 3a for a purpose that will hereinafter appear.

A cover 8 is pivotally secured to the side wall 2 of the box by hinges 9 and 10. The cover 8 has lateral side flanges 8a and 8b which, in the closed position of the cover, overlap the side walls 2 and 3. Ribs 8c and 8d are also formed in the cover and these ribs act as reinforcing ribs and also extend, in the closed position of the cover, along the edges of the end walls 4 and 5 and serve to prevent the insertion of a flat tool between the cover and the end walls.

The hinges 9 and 10 are identical. The hinge 9 consists of a single piece of heavy wire that is bent back upon itself forming a curved end and two parallel legs 9a and 9b. The curved end of the wire is bent to extend at right angles to the plane of the axes of the legs 9a and 9b and forms a hinge loop 9c. This hinge loop extends through and reenters the side wall 2 so that the hinge loop 9c extends from the outer surface of the side wall and the legs 9a and 9b lie along the inner surface of the side wall 2. The hinge loop also passes through an elongated slot 11 formed in the flange 8a of the cover. A plate 12 is provided for securing the legs 9a and 9b of the hinge 9 and the legs 10a and 10b of the hinge 10 to the inner surface of the side wall 2. This plate has four recesses 12a, two at each end thereof, to receive the ends of the legs of the hinges, and a lateral, inwardly extending flange 12b the purpose of which will hereinafter appear. The plate 12, with the legs of the hinges thereunder, may be spot welded to the inner surface of the wall 2, thus rigidly securing the hinges in place.

Elongated slots 11 are provided in the flange 8a of the cover 8 to receive the hinge loops 9c and 10c to permit limited longitudinal movement of the cover with respect to the box. The slots are of such length and so positioned that the cover may be moved from a position shown in full lines in Fig. 4 and a position shown in broken lines. In the lower position of the cover, the upper edge of the cover clears the cover of a meter mounted on the base plate 6, and in the other position the upper edge of the cover comes within the space occupied by the meter. Thus, in the closed position of the cover, it cannot be moved longitudinally of the box while a meter with the case thereon is in position on the base plate 6, and likewise under the same conditions, the cover can only be closed when in the lower position, the position in which it clears the case of the meter.

For the purpose of locking the cover in the closed position on the box, there is provided a latch 13. This latch is a single piece of heavy sheet metal and includes a base 13a and two parallel legs 13b and 13c. The legs 13b and 13c extend through a slot formed in the rear wall of the box and extend into the box perpendicular to the rear wall. The base 13a is secured to the outer surface of the rear wall as by spot-welding. At the ends of each of the legs 13b and 13c there are lateral, oppositely extending flanges 13d and 13e respectively for engaging a cooperating member on the cover. The legs are held from spreading by wings 13f and 13g, one of which extends from each leg and overlaps the other. These legs are however free for movement towards each other.

To the inner surface of the cover 8 of the box there is welded a plate 14. The plate 14 extends transversely of the cover of the box and at one end, that adjacent the flange 8b of the cover, it is drawn and shaped to form a slot adapted and positioned to cooperate with the latch 13 in locking the cover on the box. This section 14a forms an enclosed recess with the cover of the box and it has a slot formed therein having a section 14b of one width and a section 14c of a greater width. The latter section of the slot is of sufficient width to pass the lateral flanges 13d and 13e of the latch 13 without springing the legs 13b and 13c towards each other. The section 14b of the slot is of substantially less width and such that when the legs 13b and 13c of the latch 13 enter the section 14b, the flanges 13d and 13e overhang the edge of the slot. It will be observed that the section 14b of the slot is positioned such that upon closing the cover, when the cover is in its lowermost position, it is directly over the latch member and the legs of the latch member must enter this section of the slot. For this reason, the sides of this section of the slot are inclined inwardly to form a bevel which forces the legs of the latch member together when the cover is pressed down on the box and causes the flanges 13d and 13e to clear the edges of the slot and enter therein. When the box cover is in its upper position, the section 14c of the slot is coincident with the latch member 13 and since this section is of sufficient width to pass the flanges 13d and 13e the cover may be opened. Thus, the cover can only be opened when the meter cover is removed.

When the legs of the latch member enter the slot they are held from movement towards each other. For this purpose, there is provided a spring tongue 14d that extends from the end edge of the section 14c of the slot along the longitudinal center of the slot. As the cover is forced down on the box and the legs 13b and 13c are contracted, the spring tongue 14d is pressed inwardly. When the flanges 13d and 13e of the latch member clear the edges of the slot, the legs spring apart and the spring tongue 14d springs into position between the legs as seen in Fig. 6. With the tongue 14d in this position, it is impossible to force the legs of the latch member together and thus into a position where the flanges 13d and 13e would clear the edges of the section 14b of the slot. This tongue 14d may either be struck from the plate 14 or be a separate piece of phosphor bronze strip secured to the plate 14 in any suitable manner.

At the opposite end of the plate 14, adjacent the flange 8a, there are offset tongues each having two sections, one 14e perpendicular to the cover and a lateral flange 14f at the end of the section 14e. These tongues are so positioned, and of such length, that in the closed position of the cover, the flanges 14f of one of them extend below the flanges 12b formed (see Fig. 6) on the plate 12. When the cover is in the closed position on the box, these tongues, through engagement with the flanges 12b on the plate 12, prevent movement of the hinged end of the cover outwardly away from the box. The inner lock effected by the tongues 14e and the plate 12 is provided so that the box cannot be opened even though the hinged loops 9c and 10c are cut off. If these hinged loops were cut off, the tongues 14e, by engagement with the flange 12b on the plate 12, would prevent movement of the cover 8 away from the box.

The plate 14 closes a rectangular opening 15 through the cover of the box. This opening, together with the plate 14, forms a recess in the outer surface of the cover of the box. Tongues 16 and 17 are cut from one edge of the cover 8 and are bent in semicircular configuration to form loop hinges. These loops extend from the cover and the ends thereof are entered in slots provided therefor in a door 18 that is received in the opening 15 in the cover. This door is thus pivotally secured to the cover and closes access through two circular openings 14g and 14h which openings are provided for the purpose of disconnecting the metered circuit at the terminal block in the meter box. The cover also has a drawn portion 18a to accommodate the head of a machine screw 19. Adjacent the side of the plate 14 opposite that side from which the hinged tongues 16 and 17 are struck, a tongue 20 is struck from the cover and extends perpendicular thereto. This tongue 20 is positioned to enter a slot 18b in the door 18 when the door is closed against the cover. The tongue 20 is provided with an opening 20a through which a seal or lock may extend and thus seal or lock the door 18 in the closed position.

Below each of the openings 14g and 14h through the plate 14 there is a connector block 21, only one of which is illustrated. The opening 14h in the closed position of the cover is directly above the circular recess 21a in the connector block. Within this recess, there is a nut and bolt 21b of a type well known in the art, through which the metered circuit may be disconnected, merely by unscrewing the nut. Through the plate 14 there is also a hole 14i to receive the machine screw 19. The machine screw 19 extends through the opening 14i and into an opening 21c in the block 21. This screw is provided for the purpose of locking the cover against longitudinal movement with respect to the box when there is no meter in place on the base plate 6 and the electrical supply is to remain alive. When the meter has been removed the cover of the box is closed and the screw 19 is inserted. The screw extending into the block 21 holds the cover against longitudinal movement with respect to the box and thus in the position in which the cover is securely latched on the box. When the door 18 is closed, the head of the screw 19 is inaccessible and can only be reached by breaking the seal or opening the lock that secures the door 18 in the position in which it is within the recess formed by the opening 15 in the cover.

The extended sections of the side walls 2 and 3 above the end wall 4 together with the lower section of the base plate 6 and the upper section of the cover 8 form a terminal compartment for the terminal chamber 7b of the meter 7. When the meter is positioned on and secured to the base plate 6, the terminal chamber 7c of the meter extends into this compartment and the wires from the terminal chamber extend into the meter box through an opening 4a in the end wall 4. The terminal chamber of the meter is clamped in the terminal compartment by a clamp 22. This clamp is a strip of heavy sheet metal of sufficient width and design to accommodate any terminal chamber of existing meters and having a lateral flange 22a at one end thereof. The lateral flange has two spaced slots 22b and 22c therethrough (but may have more), each slot being adapted to receive the tongue 3c on the extension 3a of the side wall 3. The several slots are provided to permit adjustment of the clamp with respect to the rear wall so that terminal chamber of various thickness may be securely clamped in the terminal compartment.

When a meter is set in place on the base plate 6 and the upper end thereof is secured to the base plate by a machine screw 7a, the terminal chamber extends into the terminal compartment. The proper slot in the flange 22a of the clamp 22 is aligned with the tongue 3c and the tongue is entered in the slot. The clamp is then secured against the terminal chamber by a screw 23 that extends through an opening provided therefor adjacent the end of the clamp and into a threaded opening in a lug 24 formed on the side 2 of the box.

The clamp has a series of detents 22b, an opening 22c, a semicircular bulge 22d and it is shaped to accommodate the terminal chamber of practically any existing meter of the bottom-connected type. The detents, opening and bulge are so designed and positioned and the design of the clamp is such that that same part, or parts, on the terminal chamber of practically every existing meter of the bottom-connected type is engaged by the clamp so that it is impossible to withdraw the terminal chamber of the meter from the terminal compartment while the clamp is in place.

The meter 7 is an extreme type of bottom-connected meter. This meter has a stud 7d extending from the front of the terminal chamber and is provided for securing a plate over the terminal chamber. When used with the meter box herein described, the cover plate for the terminal chamber is removed, the stud 7d extends through the opening 22c in the clamp, and the detents extend into and engage the lower edge of the terminal chamber. With this form of meter, the cover is held on to the meter by wing nuts 7e screwed on to studs 7f extending from the meter and through the cover. These wing nuts are secured together and sealed. Thus it will be seen that all of the connections to the meter are secured by the single meter seal sealing the cover.

In Figs. 12 to 14 there is disclosed a late form of bottom-connected meter. With this form of meter the clamp 22 is not used. This meter is provided with a metal case 25 that encloses the terminal chamber 26. A removable sheet metal cover 27 for the terminal chamber is provided to permit access to the connectors in the terminal chamber. This meter is so constructed that the cover 28 must be rotated counter-clockwise, as seen in Fig. 12, before it can be removed. Such rotation however can only be effected when a slidable bracket 29 is moved to the right as seen in Fig. 12. This bracket has a lateral flange 29a having a slot therethrough to receive a lug 30 extending from the side of the meter. The meter seal 31 is inserted through an opening in this lug and thus the cover of the meter cannot be removed without breaking the seal. The terminal chamber of this meter with the cover 27 thereon is received in the terminal compartment of the meter box. It is secured in place by machine screws 32 and 33 that fasten the metal case 25 to the base 6. The cover of the box has a section of the corner removed to allow for this sealing arrangement of this form of meter. Thus access to all of the connections to this meter are likewise under the protection of the single meter seal.

To prevent access to the terminals of the meter around the side edges of the terminal compartment, there is provided a U-shaped bracket 34 that extends through the opening in the end wall 4 and against which the lower edge of the terminal compartment abuts. This bracket may be positioned to accommodate meters having terminal chambers of different lengths. For this purpose, the wall 34a of the bracket is provided with a slot 34b which is of less width than the head of a screw 35 but of sufficient width to receive the body of the screw. In use the wall 34a of the bracket is secured to the rear wall of the box by the screw 35 which is received in the slot 34b. The bracket is positioned so that the edge thereof abuts against the end of the terminal chamber and then the screw is tightened.

When there is no meter in place (see Figs. 8 and 10) the bracket 34 is used to close the opening 4a through the end wall 4. For this purpose, the legs of the bracket are slotted at the edge thereof as at 34c and 34d. These slots receive the edge of the end wall at the opening 4a and the rear wall of the bracket forms a closure for the opening 4a, the legs or side walls of the bracket extending into the meter box. The bracket, when so positioned, cannot be displaced to uncover the opening 4a as it cannot be drawn through the opening and it cannot be pushed into the box past the head of the screw 35.

From the foregoing description of the embodiment of the invention disclosed in the drawings it will be seen that there is provided a meter box that is completely protected against unauthorized tampering with the meter connections.

It will be obvious that various changes may be made by those skilled in the art in the details of the embodiment of the invention illustrated in the drawings and described in detail above within the principle and scope of the invention as expressed in the appended claims.

I claim:

1. In a meter box for enclosing the connections to an electric meter, the combination comprising a box having a base, side and end walls and forming an enclosure for meter terminals, a cover pivotally secured at one side to the box and movable in two directions, means for latching the other side of the cover to the box, said latching means being releasable upon movement of the cover in a direction other than about said pivotal connection, and means within the box in addition to the pivotal connection of the cover to the box for securing the pivoted side of the cover to the box.

2. In a meter box for enclosing the connections to an electric meter, the combination comprising a box having a base, side and end walls and forming an enclosure for meter terminals, a cover pivotally secured at one side to the box and movable longitudinally of the axis of said pivotal connection, means for latching the other side of the cover to the box, said latching means being releasable upon movement of the cover in a direction longitudinally of the axis of the pivotal connection and means within the box in addition to the pivotal connection of the cover to the box for securing the pivoted side of the cover to the box including an inwardly extending projection on the inner surface of the side of the box and a projection extending from the inner surface of the cover and positioned to engage the projection on the side of the box in the closed position of the cover.

3. In a box for enclosing the connections to an electric meter having a removable cover secured in place and sealable, the combination comprising a box having a base, side and end walls, a cover for the box pivotally secured to a wall of the box and movable longitudinally of the axis of the pivotal connection, means within the box for latching the cover closed on the box only when positioned at one end of its longitudinal movement with respect to the box, an interlock within the box for locking the hinged edge of the cover in place on the box independently of the hinge, and means for associating the box with a meter whereby longitudinal movement of the cover of the box from the position in which the cover is secured by the latching means is restrained when the cover of the meter is in place.

4. In a box for enclosing the connections to an electric meter having a removable cover secured in place and sealable, the combination comprising a box having a base, side and end walls, a cover for the box pivotally secured to the wall of the box and movable longitudinally of the axis of the pivotal connection, means within the box for latching the cover closed on the box only when positioned at one end of its longitudinal movement with respect to the box, and means for securing the cover of the box against longitudinal movement when the meter is removed.

5. In a box for enclosing the connections to an electric meter having a removable cover secured in place and sealable, the combination comprising a box having a base, side and end walls, a cover for the box pivotally secured to the wall of the box and movable longitudinally of the axis of the pivotal connection, means within the box for latching the cover closed on the box only when positioned at one end of its longitudinal movement with respect to the box, means for securing the cover of the box against longitudinal movement when the meter is removed, and means for enclosing said last mentioned means and sealing the closure means.

6. In a box for enclosing the connections to an electric meter having a removable cover secured in place and sealable, the combination comprising a box having a base, side and end walls, a cover for the box pivotally secured to the wall of the box and movable longitudinally of the axis of the pivotal connection, means within the box for latching the cover closed on the box only when positioned at one end of its longitudinal movement with respect to the box, and means for securing the cover of the box against longitudinal movement when the meter is removed including a screw extending through the cover and into the connector block and means for enclosing the screw.

7. In a box for enclosing the connections to an electric meter having a removable cover secured in place and sealable, the combination comprising a box having a base, side and end walls, the base and side walls extending beyond the end wall and forming an open-end compartment to receive the extending terminal chamber of the meter, a cover for the box of sufficient length to substantially cover the open-end compartment pivotally secured to a wall of the box and movable longitudinally of the axis of the pivotal connection, means within the box for latching the cover closed on the box only when positioned at one end of its longitudinal movement with respect to the box, and means within the open-end compartment for securing the extended terminal chamber of the meter and securing the terminal chamber therein.

8. In a box for a meter of the bottom-connected type having a removable cover and an extending terminal chamber, the combination comprising a box having a base, side and end walls, the base and side walls extending beyond one end wall and forming an open-end compartment to receive the extending terminal chamber of the meter, a cover for the box of sufficient length to substantially cover the open-end compartment movable relative to the box in a plane parallel to the base of the box between a position in which it clears the cover of the meter and a position in which it extends into the space occupied by the cover of the meter, means for maintaining the cover closed on the box only when positioned to clear the cover of the meter, and clamping means within the open-end compartment positioned to engage the extending terminal chamber including an extending tongue, a clamp having a lateral extension on one end thereof with a plurality of spaced slots to receive the tongue, detents on the clamp for engaging the terminal chamber of the meter and means for securing the other end of the clamp to the box.

9. In a box for a meter of the bottom-connected type having a removable cover and terminal chamber, the combination comprising a box having a base, side and end walls and forming an enclosure for the terminal chamber of the meter, a cover for the box movable relative to the box in a plane parallel to the base of the box between a position in which it clears the cover of the meter and a position in which it extends into the space occupied by the cover of the meter, and means for maintaining the cover closed on the box only when positioned to clear the cover of the meter including a bracket depending from the inner surface of the cover and having a slot therein consisting of two sections one of greater width than the other, a spring latch mounted in the box and positioned to be received in the section of the slot of lesser width when the cover is positioned to clear the cover of a meter.

10. In a box for a meter of the bottom-connected type having a removable cover and terminal chamber, the combination comprising a box having a base, side and end walls and forming an enclosure for the terminal chamber of the meter, a cover for the box movable relative to the box in a plane parallel to the base of the box between a position in which it clears the cover of the meter and a position in which it extends into the space occupied by the cover of the meter, and means for maintaining the cover closed on the box only when positioned to clear the cover of the meter including a bracket depending from the inner surface of the cover and having a slot therein consisting of two sections one of greater width than the other, a spring latch mounted in the box and positioned to be received in the section of the slot of lesser width when the cover is positioned to clear the cover of a meter including two spaced, resilient standards having oppositely extending lateral flanges on the ends thereof, and means for maintaining the standards in spaced relation when the standards extend into the bracket on the cover.

11. In a box for a meter of the bottom-connected type having a removable cover and terminal chamber, the combination comprising a box having a base, side and end walls and forming an enclosure for the terminal chamber of the meter, a cover for the box movable longitudinally of the box between a position in which it clears the cover of the meter and a position in which it extends into the space occupied by the cover of the meter, and means for maintaining the cover closed on the box only when positioned to clear the cover of the meter including a bracket depending from the inner surface of the cover and having a slot therein consisting of two sections one of greater width than the other, a spring latch mounted in the box and positioned to be received in the section of the slot of lesser width when the cover is positioned to clear the cover of a meter including two spaced, resilient standards having oppositely extending lateral flanges on the ends thereof, and a resilient member within the bracket on the cover and positioned to extend between the said resilient standards when the standards extend into the bracket on the cover.

12. In a box for a meter of the bottom-connected type having an extending terminal chamber, the combination comprising a sheet metal box having a base, side and end walls, the base and side walls extending beyond one end wall and forming an open-end compartment to receive the extending terminal chamber of the meter, clamping means within the open-end compartment positioned to engage the extending terminal chamber of the meter and secure the terminal chamber within the compartment, and a cover for the box of sufficient length to substantially cover the open-end compartment.

ALBERT J. ALLEN.